United States Patent
Stiefvater et al.

[15] 3,664,105
[45] May 23, 1972

[54] RAKE-TEDDING DEVICE

[72] Inventors: Thomas L. Stiefvater, New Holland; James G. Greiner, Leola; John K. Hale; Thomas W. Waldrop, both of New Holland, all of Pa.

[73] Assignee: Sperry Rand Corporation, New Holland, Pa.

[22] Filed: May 24, 1971

[21] Appl. No.: 146,231

[52] U.S. Cl. ..................................................56/370
[51] Int. Cl. .............................................A01d 79/00
[58] Field of Search .................56/11.1, 13.5, 15.8, 17.2, 56/370, 376, 377

[56] References Cited

FOREIGN PATENTS OR APPLICATIONS 450,791   4/1968   Switzerland ..........................56/370
2,011,564  1/1970  Germany ...............................56/370

Primary Examiner—Louis G. Mancene
Assistant Examiner—J. A. Oliff
Attorney—John C. Thompson, Joseph A. Brown, George C. Bower, Larry L. Coats and James J. Kennedy

[57] ABSTRACT

A double rotor cam actuated rake-tedding device in which each rotor includes a cam disposed around a cylindrical housing. Each cylindrical housing is rotatively mounted about a vertical axis and is normally held stationary with respect thereto by a locking pin which is spring biased to extend up through one of a series of apertures formed within a bottom floor portion of the cylindrical housing, the series of apertures being particularly spaced such that the cam associated therewith may be rotatively adjusted for raking or tedding. Further provided is a two speed input drive means for selectively rotating the double rotors at a high and a low speed for tedding and raking respectively.

6 Claims, 18 Drawing Figures

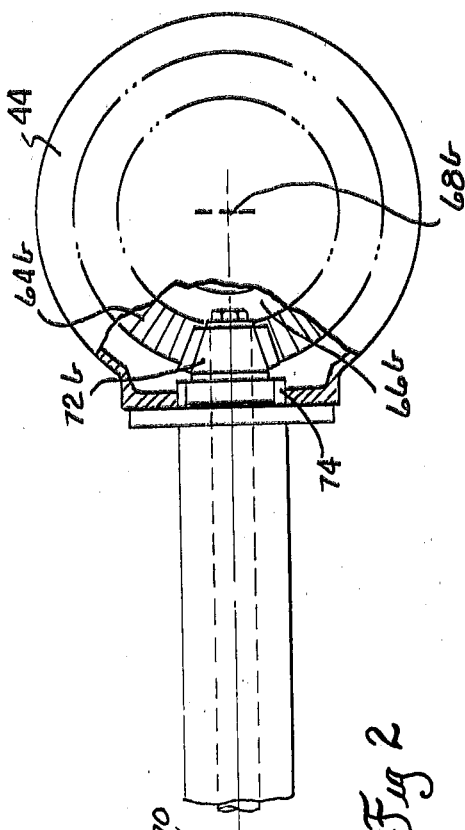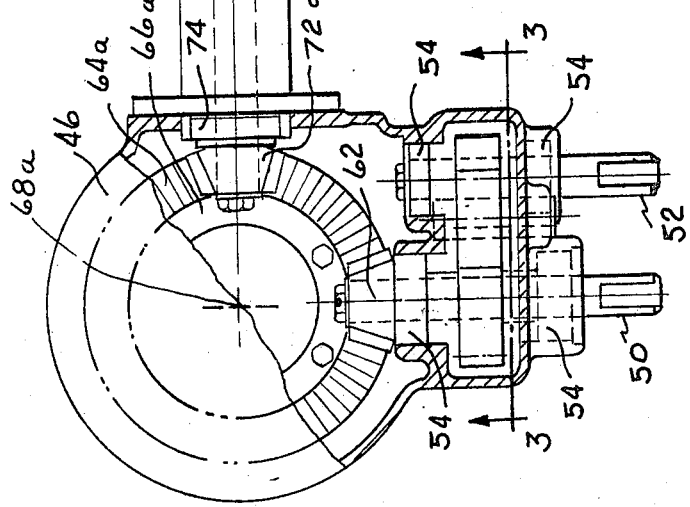

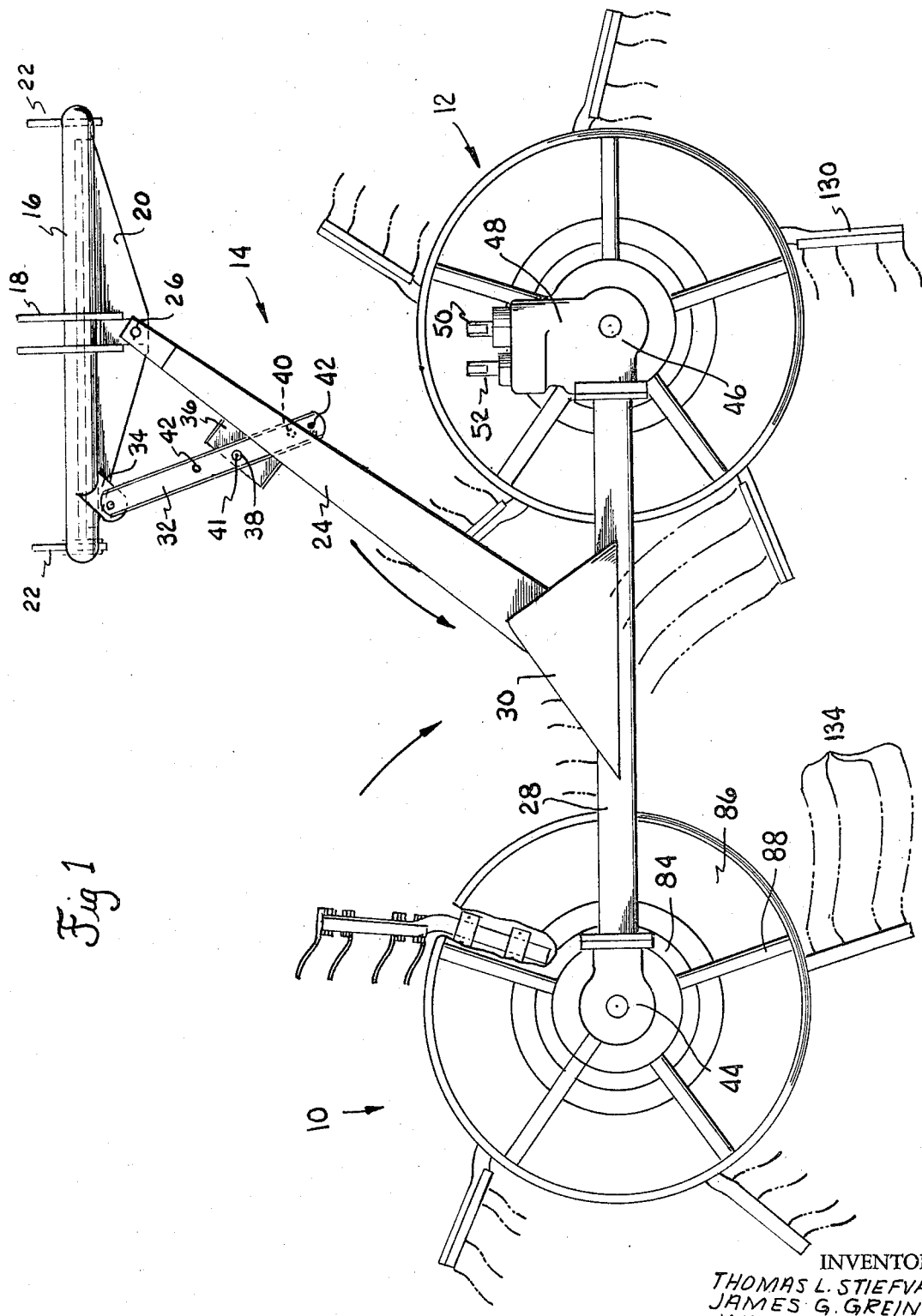

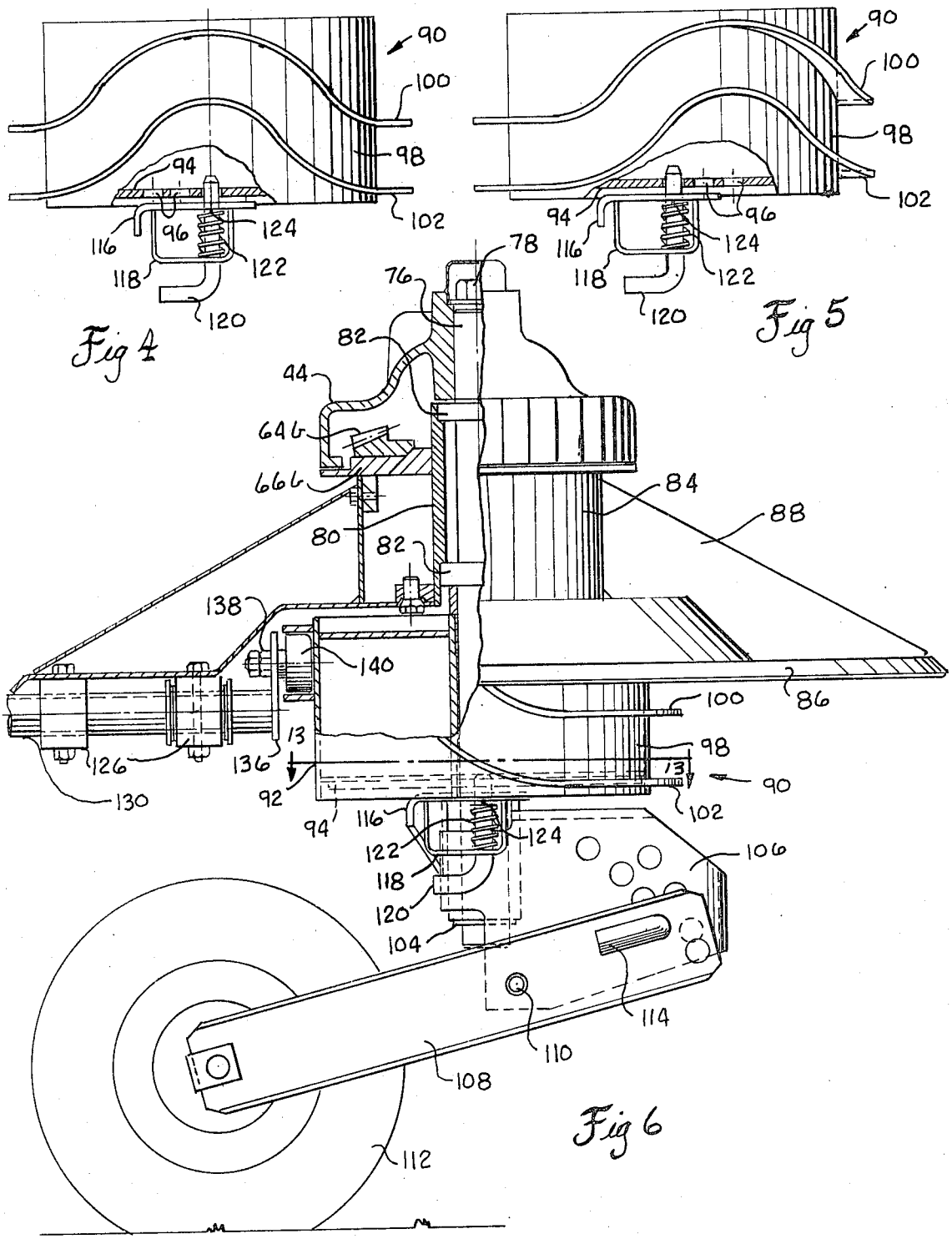

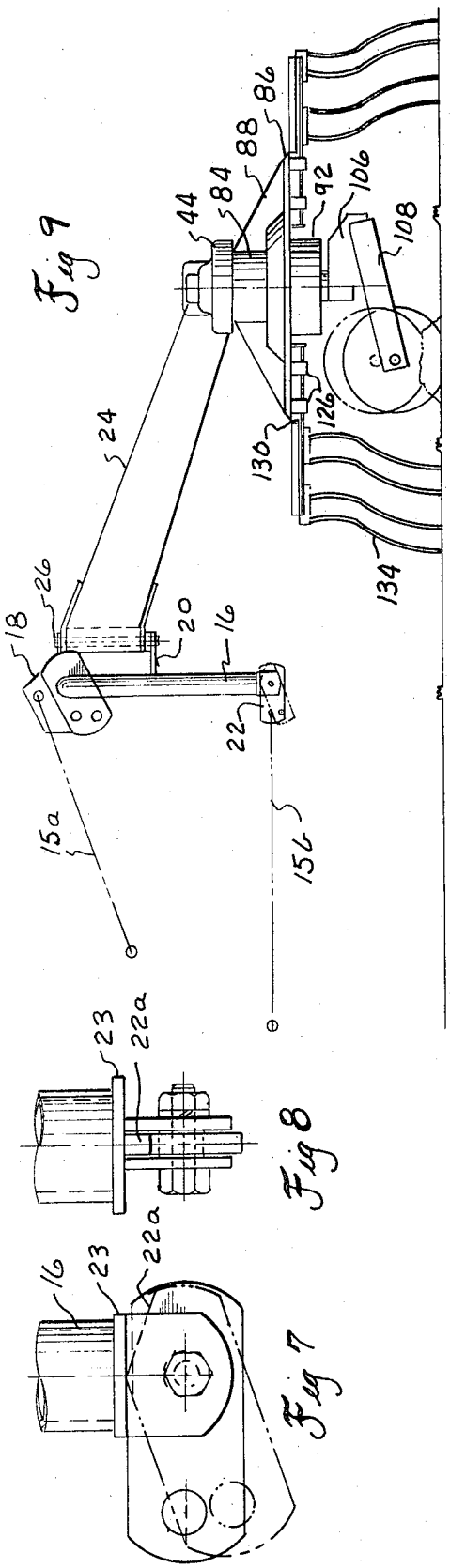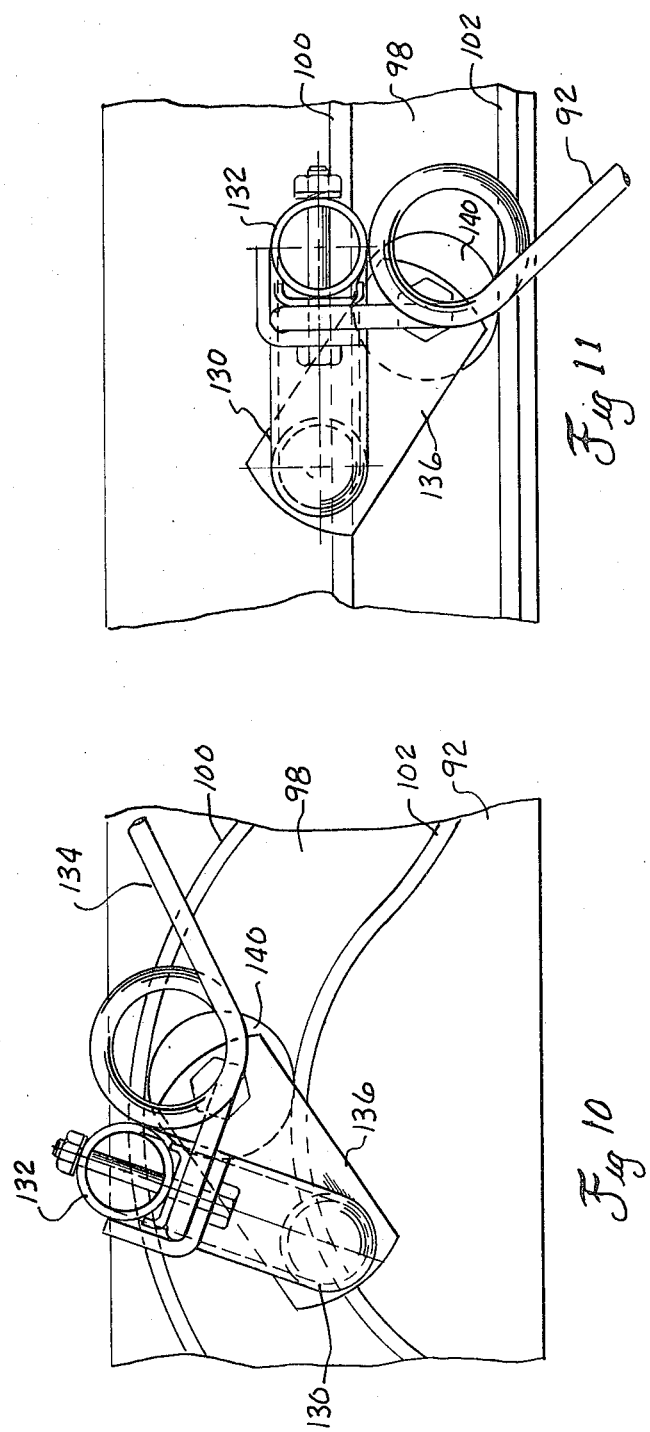

INVENTOR
THOMAS L. STIEFVATER
JAMES G. GREINER
JOHN K. HALE
THOMAS W. WALDROP
ATTORNEY

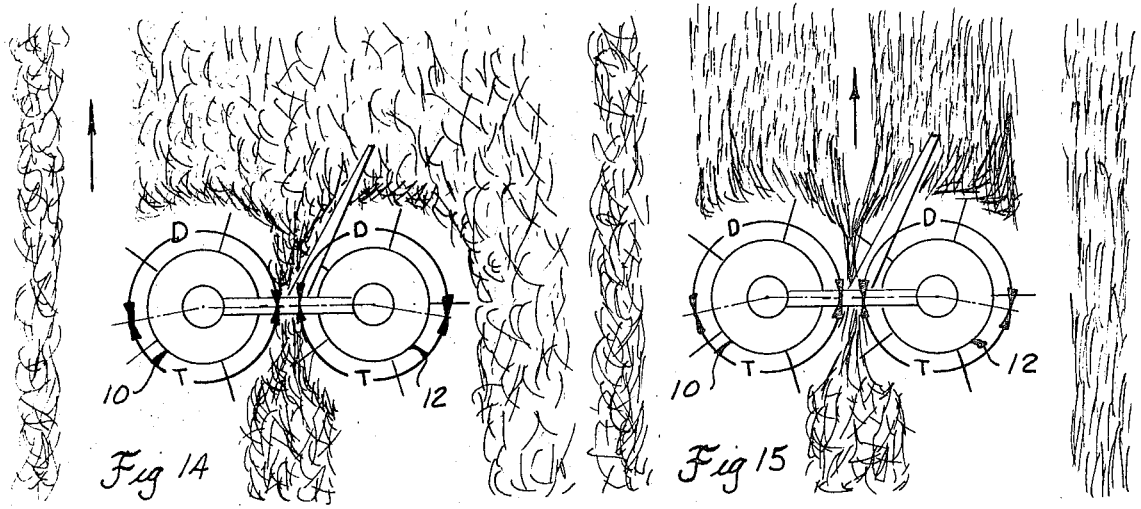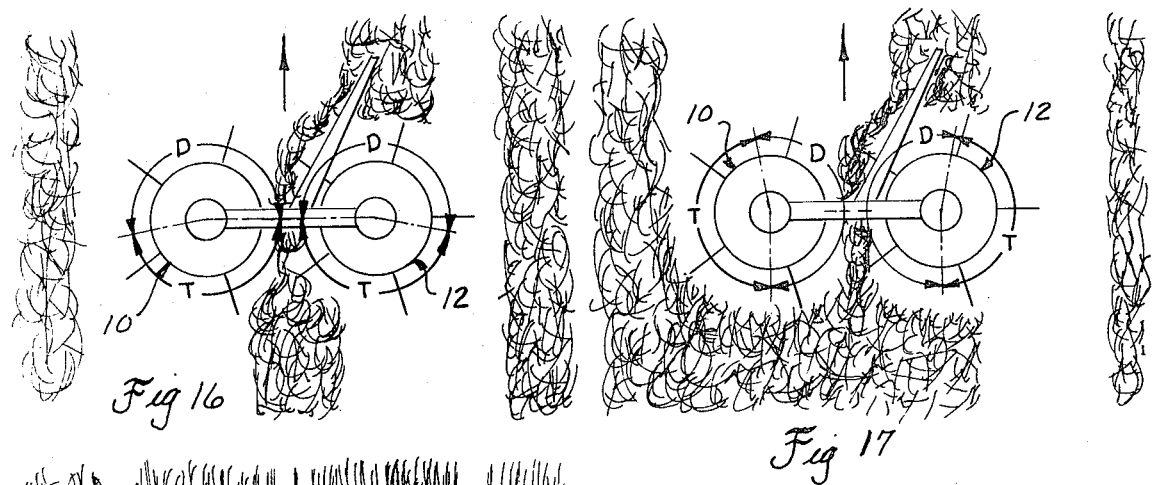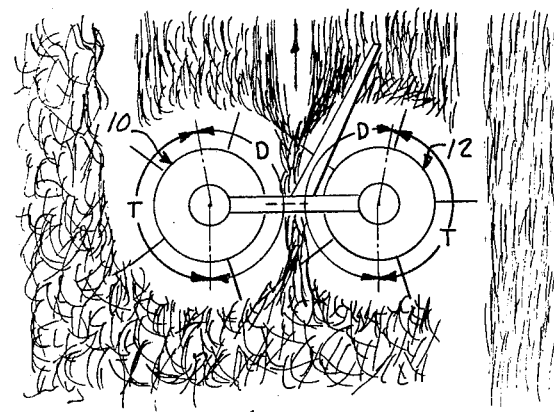

RAKE-TEDDING DEVICE

BACKGROUND OF THE INVENTION

This invention relates to agricultural machinery and more particularly to rake-tedding devices of the rotor cam actuated type.

Rotor type rake-tedding machines have gained acceptance as an efficient and economical means for raking and tedding hay, especially in the more humid European countries where the hay must be turned and moved more frequently for proper drying. One particular type of rotor rake-tedder is the "cam actuated" type in which a cam is used in conjunction with a following mechanism to actuate a plurality of equally spaced tine bars that extend outwardly from the rotor. As the tine bars cycle with the rotor, the following mechanism engages the cam and causes the tine bars to rotate about their radial axis, causing the tines which depend from the outer end of the tine bars to gradually move from a crop engaging position to a raised elevated position. The cam is constructed of such a profile that either raking or tedding may be accommodated. But to perform raking and tedding the cam must be adjustable so that the position that the tines engage and release the crop is adjustable relative to the rotors and direction of travel of the rake-tedding device. Therefore it is desirable to provide a cam assembly within each rotor that is easily adjustable about a vertical axis.

In performing the raking operation the tines function to sweep an entire swath of crop material into a windrow and then raise, releasing the crop in a narrow path that generally extends between the laterally spaced rotors. To ted, the cam is adjusted such that the tines engage the windrow and sweep it outwardly therefrom spreading it about a width that approximates the original swath width. In using the double rotor rake-tedding device for raking it has been found that a slower speed must be used to effectively form the windrow. Thus to optimize the efficiency of the rake-tedding device it is desirable to provide it with a two speed input drive means, one input drive being slower than the other to accommodate raking while the faster speed is employed for tedding.

SUMMARY OF THE INVENTION

Applicants' invention includes a double rotor rake-tedding device with each rotor having a cam for actuating tines depending from outwardly extending tine bars that are radially disposed about each rotor. The cam is disposed around a cylindrical housing which has a bottom floor portion with a series of particularly spaced apertures formed therein. The cylindrical cam housing is rotatively mounted on a common vertical axis with the rotor and is selectively held stationary with respect to the vertical axis by a locking pin mechanism that is spring biased to extend up through a selected aperture in the bottom floor of the cylindrical cam housing. The apertures are spaced such that the cam may be adjusted for either raking or tedding.

Furthermore applicants have provided the present invention with a two speed gearbox having two input drive shafts for driving the double rotors at two different speeds, a low speed for raking and a high speed for tedding.

It is therefore the object of the present invention to provide a cam actuated rotor type rake-tedding device in which the cam of each rotor is readily adjustable for raking or tedding.

It is also an object of the present invention to provide a rotor type rake-tedding device having a two speed input gearbox for selectively rotating the rotors at a fast and low speed for accommodating tedding and raking respectively.

Another object of the present invention is to provide the cam of each rotor with a cylindrical housing that is rotatively mounted about a common vertical axis with each rotor and includes a floor portion having a series of apertures particularly spaced therein for receiving a locking pin that is stationarily fixed with respect to said vertical axis such that said cam and cylindrical housing is held in a stationary position with respect to the rotating rotor but is adjustable by releasing the locking pin from the particular selected aperture and rotating the cam to a desired position to accommodate the selected field operation, raking or tedding.

A further object of the present invention is to provide each rotor with a ring gear and to further provide a drive shaft between the two with a pair of pinions fixed to each end for transmitting the motion of one ring gear to the other ring gear and to further provide a two speed gear box for driving said one ring gear, the two speed gearbox including a pair of spaced input drive shafts with one drive shaft directly driving said one ring gear and the other input drive shaft driving the other input drive shaft and said one ring gear indirectly.

A further object of the present invention is to provide the rotors with a hitching frame structure that includes a pair of floating links that are adapted to attach to the lower outside lift links of a conventional three point tractor attachment.

Another object of the present invention is to provide each rotor with an adjustable wheel for varying the height of the rotors with respect to the ground.

Other objects and advantages of the present invention will become apparent and obvious from a study of the following description and the accompanying drawings which are merely illustrative of the present invention.

DESCRIPTION OF THE DRAWINGS

FIG. 1 is a plan view of the rake-tedder.

FIG. 2 is a plan view of the rotor drive and two speed gearbox with portions cut away so that components thereof may be illustrated more clearly.

FIG. 3 is a sectional view taken through the line 3—3 of FIG. 2.

FIGS. 4 and 5 are side elevational views of the cam assembly and associated locking mechanism.

FIG. 6 is a side elevational view of a rotor assembly with one side shown in section.

FIGS. 7 and 8 are fragmentary views showing a floating link means for interconnecting a hitching frame structure with a three point tractor hitch.

FIG. 9 is a side elevational view of the rake-tedder particularly showing the hitching frame and manner of connection with the three point tractor hitch.

FIGS. 10 and 11 are fragmentary side elevational views particularly illustrating the movement of the tines as the follower mechanism moves along the cam assembly.

FIGS. 14–18 are schematic illustrations of the rake-tedder performing various raking and tedding field operations.

Figure 12:
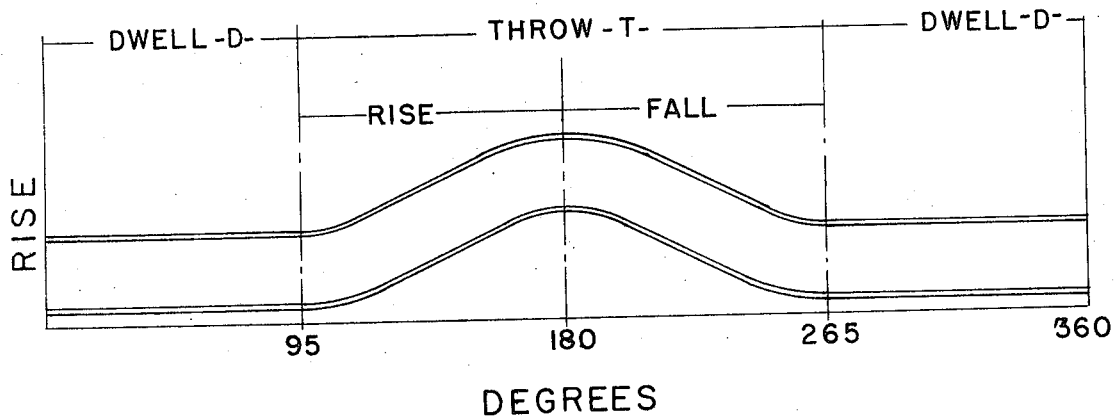
FIG. 12 is a graphical illustration of the cam profile.
Figure 13:
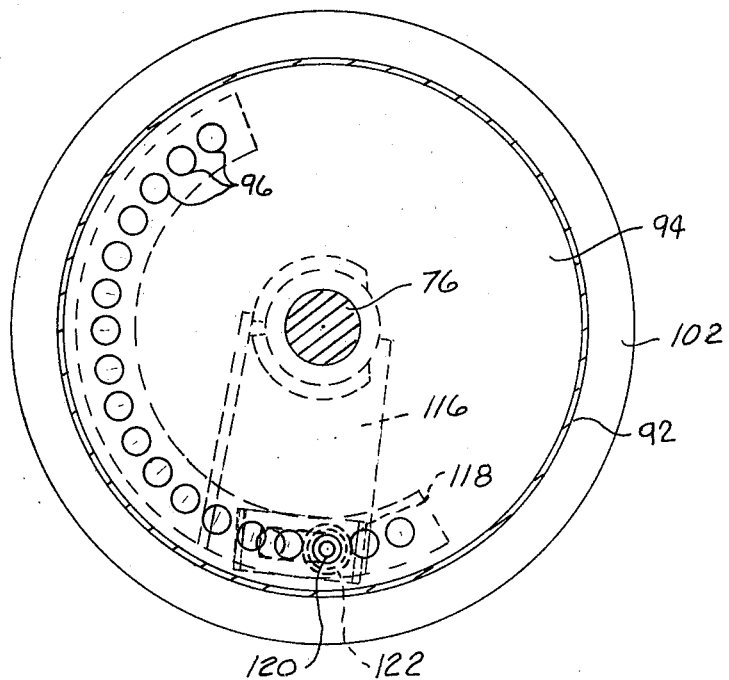
FIG. 13 is a plan view taken along the line 13—13 of FIG. 6.

In the following description right-hand and left-hand reference is determined by standing to the rear of the rake-tedder and facing the direction of travel.

DESCRIPTION OF THE PREFERRED EMBODIMENT

With particular reference to the drawings, particularly FIG. 1, the rake-tedding device of the present invention is generally comprised of a pair of left and right-hand rotor assemblies indicated by numerals 10,12 respectively. The rotor assemblies 10,12 are wheel supported as shown in FIG. 6 and are pulled through the field by a hitching frame structure, indicated generally by the numeral 14, which is adapted to connect about the front thereof to a conventional three point tractor hitch 15 (FIG. 9).

The front portion of the hitching frame structure comprises a generally U-shaped yoke 16 having a top hitching assembly 18 welded about a top intermediate portion thereof and adapted to connect to an upper center link 15a of the three point tractor attachment. Pivotally secured to the lower outside ends of the yoke 16 is a pair of floating links 22 which connect the yoke with lower outside links 15b of the three point tractor attachment. As shown particularly in FIG. 9, the floating links 22 enable the frame 14 to float as the rotor assemblies 10,12 move over ground undulations. It is noted in FIGS. 7 and 8 that the floating links 22 have an upper angled edge 22a. This angled edge 22a limits the flotation of the frame 14 by butting against an upper plate 23.

A support plate 20 extends between the downwardly extending arms of the yoke 16 and cooperates with the top hitching assembly 18 to receive a pivot pin 26 which connects the main beam 24 of the hitching frame with the yoke. Main beam 24 extends rearwardly where it joins a drive housing 28 intermediately the outside ends thereof. A reinforcing plate 30 is suitably fixed to both the main beam 24 and drive housing 28 to reinforce that connection.

To position and control the lateral movement of the present rake-tedding device a lateral positioning link 32 is mounted between the left-hand side of the yoke 16 and an intermediate point on beam 24. More particularly, the front end of lateral positioning link 32 is fixed to a bracket 34 which is mounted on the left side of the yoke 16. The rearmost end of the lateral positioning link 32 is provided with two spaced apart apertures, the forward most aperture indicated by numeral 38 being provided for locking the main beam 24 such that the rake-tedding device is positioned in an offset relationship to a tractor pulling the frame. The rearmost aperture, indicated by numeral 40, is employed to lock the main beam 24 in a transport position such that the rake-tedding device is generally centered behind the tractor and frame 14. To lock the rake tedding device in either the offset or transport position a locking pin 41 is inserted through the aperture and on through a connecting plate 36 which extends laterally from the main beam 24. Also the lateral positioning link 32 is provided with a pair of spaced apart stops 42 disposed about the rearmost portion of the link. The stops 42 provide a third operating position for the rake-tedding device, this third operating position being termed a floating position as the main beam 24 is allowed to move back and forth between the stops.

Mounted on opposite ends of drive housing 28 and extending outwardly therefrom are left and right-hand gear housings indicated by numerals 44,46 respectively. Integrally formed within the right-hand gear housing 46 is a gearbox housing 48 which houses a pair of input drive shafts.

Rotatively mounted within the gearbox housing 48 are a pair of shafts, a low speed input shaft and a high speed input shaft indicated by numerals 50,52 respectively. Each shaft is supported by a pair of bearings 54 spaced along the longitudinal axis of each shaft. Each of the low and high speed input shafts 50,52 include an intermediate spur gear 56,58 respectively. (It is noted from FIG. 3 that spur gear 56 mounted on the high speed input shaft 50 is of a larger diameter than the spur gear 58 fixed to the low speed input shaft 52.) Rotative motion is transferred from one input shaft to the other input shaft by an idler gear 60 which is meshed with both spur gears 56,58 and is rotatively mounted on idler shaft 61.

The output motion of the gearbox is transmitted to a ring gear 64a of the right hand rotor assembly 12 by a pinion 62. The ring gear 64a is fixed to a carrier plate 66a that is rotatively mounted about vertical axis 68a of the right-hand rotor assembly. Ring gear 64 in turn drives pinion 72a which is fixed to the right-hand end of a transversely extending drive shaft 70, the drive shaft being rotatively mounted in a pair of laterally spaced bearings 74. The motion transmitted to drive shaft 74 is further transmitted to ring gear 64b of the left-hand rotor assembly 10 by a pinion 72b. Ring gear 64b is mounted similarly to ring gear 64a as it is fixed to a carrier plate 66b which is rotatively mounted about vertical axis 68b of the left-hand rotor assembly.

Basically the left and right-hand side rotor assemblies 10,12 are of identical construction except for the fact that the right-hand gear housing 46 has the gearbox housing 48 and gearbox associated therewith. With particular attention now directed to FIG. 6, the left-hand rotor assembly 10 is shown therein. Gear housing 44 has fixed thereto, by a bolt and nut assembly 78, a support shaft 76 which extends downwardly therefrom and generally coincides with the left-hand vertical axis 68b. Disposed below gear housing 44 is an inner hub 80 which is rotatable about support shaft 76 by a pair of axially spaced bearings 82. Carrier plate 66b and consequently ring gear 64a is fixed to the inner hub 80 and rotatable therewith as the ring gear is driven by pinion 72b (FIG. 1). Also fixed to the inner hub 80 is a housing 84 which is disposed above a bottom plate 86 which extends readily from the support shaft 76. The housing 84 and bottom plate 86 are joined by a plurality of equally spaced readily extending gussets 88.

Rotatively disposed below the bottom plate 86 is a cam assembly indicated generally by the numeral 90. The cam assembly includes a generally cylindrical housing 92 having a floor portion 94 with a plurality of particularly spaced apertures 96 formed therein. Wound around the cylindrical housing is a cam track 98 defined by an upper rail 100 and a lower rail 102. FIG. 12 shows the cam profile and as shown therein the cam profile consists of a 190 degree dwell D and a 170 degree throw T, the throw being defined as the rise plus the fall of the cam.

Keyed to the bottom of the support shaft 76 is a bottom shaft housing 104 which supports the cam assembly 90. Fixed to the bottom shaft housing 104 is a wheel assembly 106 which includes a series of apertures therein for locking a wheel arm 108 in any of a number of selected positions for adjusting the height of the rotor assembly. When adjusting the height of the rotor assembly, the wheel arm 108 is pivotal about a transversely extending axis 110. Rotatively mounted about the lower end of the wheel arm 108 is a wheel 112.

As previously pointed out the cam assembly is rotatively mounted about the support shaft 76. But in operation it is necessary that the cam assembly 90 be held stationary with respect to the rotating portions of the rotor assembly. Thus it is necessary to provide a locking mechanism and in the present case the locking mechanism comprises a main bracket member 116 which extends outwardly from the bottom shaft housing 104 and has attached to the lower side thereof a generally U-shaped bracket 118. Brackets 116, 118 have vertical aligned openings, not shown for receiving a generally J-shaped locking pin 120. The locking pin 120 is spring biased upwardly for insertion into a selected aperture of the cam floor by a compression spring 122 which is disposed around the locking pin and extends between the lower U-shaped bracket 118 and a cross pin 124 which extends through an upper portion of the locking pin 120.

Each rotor assembly includes a plurality of equally spaced radially extending tine bars 130, each tine bar having an offset outer end 132. The primary portion of each tine bar 130 is rotatively mounted in a pair of radially spaced bearings 126 which are fixed to the lower bottom plate 86. A rocker arm 136 is fixed to the inward end of each tine bar 130 and is further pivotally connected to a follower 140 by a pivot pin 138. The follower 140 is confined within rails 100,102 of the cam track 98. Thus as the follower 140 moves within the throw profile of the cam assembly 90 the tine bar 130 is rotated and the tines 134 depending from the offest outer end is lifted to a raised elevated position and lowered to a crop.

OPERATION

Before beginning operation the cam assembly 90 is adjusted to give proper raking action for the particular field operation to be performed and the tractor PTO is connected to the appropriate input shaft of the two speed gearbox 48. For windrowing, a slower speed is desired. Therefore the tractor PTO is connected to the low speed input shaft 50, which because of the particular gear ratio between pinion 62 and ring gear 64a, a rotor output speed of 90 rpm is attained for the particular embodiment shown herein. In the tedding operation, the PTO shaft is connected to the high speed input shaft 52 and the associated gear ratios yield an output rotor speed of 150 rpm, giving a 3 to 5 ratio.

As previously noted the relationship between the tine bars 130 and the cam track 98 is such that the tines 134 depending from the offset ends of the tine bars are in a crop engaging position while the follower 140 moves through the dwell D of the cam profile. As the follower 140 moves into the throw T of the cam, the rocker arm 136 rotates the tine bar such that the tines begin to lift from the ground engaging position. The particular cam profile of the present invention gives a maximum lift after the follower 140 has reached the peak of the cam throw and from the peak on down the tines move downwardly to the crop engaging position. The particular relationship between the follower 140, rocker arm 136, tine bar 130 and tines 134 is shown in FIGS. 10 and 11. It is also noted that the offset feature of the tine bars gives the tines additional lift which decreases the chances of the tines of one rotor interfering with tines of the other rotor about the inboard sides.

FIGS. 14-16 show the rake-tedding device adapted for windrowing and the letters D and T are shown therein to indicate the relative positions of the dwell and throw of the cam assembly 90 with respect to the rotor assemblies 10,12 and their attaching frame structure. For example, FIG. 15 shows the rotor assemblies performing a raking or windrowing operation of a double swath of crop material that generally extends the entire width of the rotors. FIG. 14 shows the rotor assemblies 10,12 windrowing spreaded crop material while FIG. 16 shows a windrow being turned. It is noted that the throw T of the cam is positioned to begin at approximately the three and nine o'clock positions with respect to the rotors 10,12 for all of these windrowing operations. Since the rotors are driven generally counter to the direction of travel, the tines begin their lift at the three and nine o'clock positions and continue to rise until a peak is reached at about 85 degrees into the cam throw, and then the tines begin to descend towards the crop engaging position which they reach after another 85 degrees of travel through the throw of the cam. Thus the tines then remain in the crop engaging position around the remaining portion of the rotor, raking the hay in the process. Each time the tines reach the three and nine o'clock positions they begin to lift, depositing the raked crop in a window generally between rotor assemblies 10 and 12. It is noted from FIGS. 1 and 9 that the lower tip of the tines are curved radially inward. This enables the tines to slide over the windrow as they begin their rise without topping and scattering the windrowed crop.

FIG. 18 shows the rake-tedder of the present invention tedding a pair of swaths. FIG. 17 illustrates the tedding of a windrow such as formed in FIG. 15. Note that in the tedding the throw of the cam assembly begins at approximately the six o'clock positions and that the tines are in the crop engaging position when they pass around the inboard sides of the rotor assemblies 10,12. As the tines pass along the inboard sides of the rotor assemblies, the crop is engaged and swept therearound until the tine bars 130 reach approximately the six o'clock position where they begin to rotate, lifting the tines 134 and scattering the crop in a pattern therebehind.

Often it is necessary to adjust the height of the rotor assemblies 10,12 due to the variations in the height of the stem cut. To accomplish this, the rake-tedder of the present invention has a wheel arm 112 which is pivotable about axis 110 such that the height of the corresponding rotor assembly may be adjusted by removing the locking pin 114 from its present wheel assembly aperture and pivoting the wheel arm to a desired height and reinserting the locking pin into an appropriate wheel assembly aperture.

The terms, "upper," "lower," "forward," "rearward," etc., have been used herein merely for the convenience of the foregoing specification and in the appended claims to describe the rake-tedder and its parts as oriented in the drawings. It is to be understood, however, that these terms are in no way limiting to the invention since the rake-tedder may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. In a rake-tedding device having a rotor assembly rotatively driven about a vertical axis, a plurality of equally spaced radially extending tine bars rotatively mounted to said rotor, a plurality of tines fixed to the outer end of said tine bars and generally depending downwardly therefrom for engagement with crop material lying on the ground, a cam normally fixed relative to said vertical axis, and a follower mechanism fixed to the inward end of said tine bar and engageable with said cam for rotating said tine bar about its radial axis, the improvement comprising: a mounting structure for selectively adjusting said cam for either raking or tedding, said mounting structure comprising a cylindrical housing having said cam wound therearound and a bottom plate with a plurality of particularly spaced apertures therein; a mounting bracket member fixed relative to said vertical axis and disposed adjacent said bottom plate; and a spring loaded locking pin moveably contained within said mounting bracket member and normally spring biased to extend through a selected aperture of said bottom plate for selectively stationing the cam with respect to said rotor for raking or tedding.

2. The rake-tedding device as recited in claim 1 wherein said mounting bracket member includes an upper bracket, a lower U-shaped bracket depending downwardly from said upper bracket, and wherein said locking pin extends through aligned openings of said upper and lower brackets and held therein by a cross pin extending between a compression spring disposed around said locking pin and the upper bracket.

3. The rake tedding device as recited in claim 2 wherein said locking pin is of a generally J-shape with the top portion being tapered for easily inserting the same into selected apertures of said bottom plate and said lower end being curved to form a handle portion for pulling said locking pin from said apertures such that the cam housing may be selectively repositioned.

4. The rake-tedding device as set forth in claim 1 wherein said rotor assembly is provided with a wheel rotatably mounted within an adjustable wheel mounting structure, said wheel mounting structure being adjustable to vary the height of said rotor with respect to the ground.

5. The rake-tedding device as recited in claim 4 wherein said adjustable wheel mounting structure comprises an elongated wheel arm pivotally secured intermediately between its end to a lower portion of said rotor assembly, said arm having said wheel rotatively mounted at one end and including an opening in the other end particularly spaced to align with an array of openings disposed in a plate structure fixed relative to said rotor and disposed adjacent said wheel arm; and a locking pin adapted for insertion through said arm opening and any selected one of the array of openings in said fixed plate structure for adjusting the elevation of said rotor assembly with respect to the ground.

6. The rake-tedding device as recited in claim 1 wherein said rotor assembly is provided with a hitching frame structure adapted for attachment to a conventional three point tractor hitch, the three point hitch including an upper link and a pair of lower outside links, the improvement further comprising: a pair of floating link means interconnecting said hitching frame structure with said lower outside links of the three point tractor hitch, said floating link means adapted to enable the hitching frame to move independently of said three point tractor hitch.

* * * * *